Z. I. PRATT.

Assignor to Mary E. Pratt.

CANDLESTICK.

No. 7,326. Reissued Sept. 26, 1876.

Witnesses

Robert H. Duncan

Benj. A. Smith

Inventor

Zenas I. Pratt

N. PETERS, PHOTO-LITHOGRAPHER, WASHINGTON, D. C.

UNITED STATES PATENT OFFICE.

ZIMRI I. PRATT, OF NEW YORK, N. Y., ASSIGNOR TO MARY E. PRATT.

IMPROVEMENT IN CANDLESTICKS.

Specification forming part of Letters Patent No. 166,223, dated August 3, 1875; reissue No. 7,326, dated September 26, 1876; application filed August 17, 1876.

*To all whom it may concern:*

Be it known that I, ZIMRI I. PRATT, of the city, county, and State of New York, have invented a new and useful Improvement in Candlesticks, of which the following is a specification:

The invention relates to that class of candlesticks, which, while convenient and serviceable for household use when properly constructed, are especially adapted for use in railway-cars, steamboats, and coaches, and in which the candle is constantly forced upward by means of a spring acting beneath the candle-seat, so that the flame of the candle is always at the same height.

The candlestick may be composed of three distinct parts: first, the cap, which covers the top of the candle, and is adjustable to the holder; second, the candle-seat and spring; third, the holder, in which the seat and spring operate.

The invention consists in, first, a seat, upon which the base of the candle rests, which is provided with an upturned rim, which surrounds the base of the candle, for the purpose of forming a receptacle for the melted tallow, and keeping the base of the candle directly over the spring; second, a recess so constructed in the cap that when the candle is brought into position by adjusting the cap to the holder, both walls of the recess shall lie outside of the top of the candle; third, the combination of the cap with the upturned rim surrounding the candle-seat, to prevent the melted tallow from passing down the inner wall of the holder.

Figure 1:
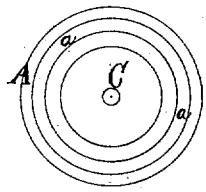
Figure 2:
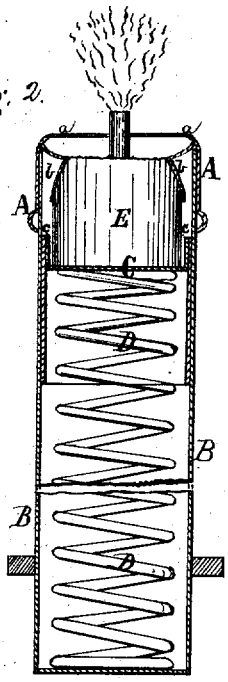

The invention is illustrated by the accompanying drawing, in which Figure 1 is a top view of the candlestick, to show its form, and Fig. 2 is a longitudinal vertical section of the same.

A represents the cap. B represents the holder containing the spring and candle-seat. C represents the candle-seat. D represents the spring. E represents the candle. *a* represents the inwardly-projecting rim on the top of the cap. *b* represents the recess formed in the cap; and *c* represents the upturned rim surrounding the candle-seat.

The candlestick may be made of any desirable material, and may be united by any of the usual methods. The rim *a* may be formed on the top of the cap by the usual method of spinning over the wall of the cap and the recess *b* by a supplemental piece of metal united to the wall of the cap above, leaving the opening from below. By making the lower part of the inner wall of the cap of the proper diameter relatively to that of the upturned rim of the candle-seat, the one will fit closely within the other as the candle is consumed, and thus the melted tallow will be confined and prevented from dripping down upon the spring. It is also desirable with view to more perfectly confining the melted tallow, that the height of the upturned rim upon the candle-seat shall bear such relation to the depth of the recess in the cap that the upper edge of the former will strike against the head of the latter, and the lower edge of the inner wall of the cap will bear upon the bottom of the candle-seat. The candle-seat C, together with its upturned rim *c* may be struck from a single piece of sheet metal by means of dies, or the upturned rim may be of a separate piece and soldered to the seat C. The cap may be adjusted to the holder by any of the usual methods, the bayonet-fastening being preferred.

This invention is designed to obviate the following difficulties which have been experienced in this class of candlesticks: first, that the melted tallow would, by any sudden jolt or motion, or by a slight inclination of the candlestick, be thrown over the top of the cap, and drip down the outside of the holder; second, that, especially when the candle was nearly consumed, the melted tallow would run down between the seat and the inner wall of the holder and upon the spring, and interfere with its operation.

In the present construction, the inwardly-projecting rim on top of the cap in a great measure obviates the former difficulty, inasmuch as it requires a heavy jar or a sharp inclination of the candlestick to cause the melted tallow to flow over the rim *a* and drop down the outside of the candlestick. The latter difficulty, also, as above explained, is overcome by the use of the upturned rim *c* of the candle-seat acting in combination with the inner wall of the cap, this combination becoming operative when the candle, nearly consumed, has become too soft to press firmly against the contracted wall of the cap above, and, consequently, begins to break up. The contact which then takes place between the upturned rim of the candle-seat and the inner wall of the cap will effectually confine the melted tallow and prevent its dripping down upon the spring.

The operation of this device is as follows: Place the candle upon its seat, force it down the holder by compressing the spring, and adjust the cap. As the smallest inner diameter of the cap is considerably less than the diameter of the candle, the candle will be forced up by the spring only as fast as its lighted end is softened by the heat, and the flame will always remain at the same level. The pressure of the spring forces the candle so closely against the inner wall of the cap as to prevent any melted tallow from passing down between the candle and the wall of the holder until the candle is nearly consumed, when the receptacle, formed by the upturned rim of the seat, is closed, as above described, and the escape of the melted tallow prevented.

What is claimed as new is—

1. The combination, in a candlestick, of the elevating-spring and a candle-seat mounted on such spring, and provided with an upturned rim, substantially as and for the purpose set forth.

2. A cap of a candlestick, provided with a recess, both of whose walls shall lie outside of the top of the candle when the candle is brought into position by adjusting the cap to the holder, substantially as and for the purpose set forth.

3. The combination of the cap of a candlestick and the upturned rim of the candle-seat, adapted to surround the base of the candle and form a receptacle for the melted tallow, substantially as and for the purpose described.

ZIMRI I. PRATT.

Witnesses:

ROBERT H. DUNCAN,
BENJ. A. SMITH.